US008655385B2

(12) United States Patent
Li (10) Patent No.: US 8,655,385 B2
(45) Date of Patent: Feb. 18, 2014

(54) SOCIAL NETWORKING METHODS AND APPARATUS FOR USE IN FACILITATING PARTICIPATION IN USER-RELEVANT SOCIAL GROUPS

(75) Inventor: Andrey Li, Ottawa (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/299,546

(22) Filed: Nov. 18, 2011

(65) Prior Publication Data

US 2013/0132865 A1 May 23, 2013

(51) Int. Cl.
*H04W 24/00* (2009.01)
(52) U.S. Cl.
USPC ............ 455/456.3; 455/456.1; 455/456.2; 455/550.1
(58) Field of Classification Search
USPC ........... 455/456.1, 456.2, 456.3, 434, 414.1, 455/416, 418, 550.1, 519
See application file for complete search history.

(56) References Cited

U.S. PATENT DOCUMENTS

| | | | |
|---|---|---|---|
| 6,343,313 B1 | 1/2002 | Salesky et al. | |
| 6,965,675 B1 | 11/2005 | Trimberger et al. | |
| 7,200,112 B2 | 4/2007 | Sundar et al. | |
| 8,045,980 B2 | 10/2011 | Buckley et al. | |
| 8,254,985 B2 | 8/2012 | Ekici et al. | |
| 2001/0027111 A1 | 10/2001 | Motegi et al. | |
| 2002/0090954 A1 | 7/2002 | Tanaka et al. | |
| 2003/0142641 A1 | 7/2003 | Sumner et al. | |
| 2006/0223518 A1 | 10/2006 | Haney | |
| 2007/0037574 A1 | 2/2007 | Libov et al. | |
| 2007/0281716 A1 | 12/2007 | Altman et al. | |
| 2008/0132202 A1 | 6/2008 | Kirkup et al. | |
| 2008/0182563 A1 | 7/2008 | Wugofski et al. | |
| 2009/0082038 A1 | 3/2009 | McKiou et al. | |
| 2009/0201896 A1 | 8/2009 | Davis et al. | |
| 2010/0036912 A1 | 2/2010 | Rao | |
| 2011/0014897 A1 | 1/2011 | Finucan | |
| 2011/0035384 A1 | 2/2011 | Qiu | |

(Continued)

FOREIGN PATENT DOCUMENTS

| | | |
|---|---|---|
| WO | 2009070138 A1 | 6/2009 |
| WO | 2010096063 A1 | 8/2010 |
| WO | 2010098938 A2 | 9/2010 |

OTHER PUBLICATIONS

PCT Search Report & Written Opinion for PCT Application # PCT/CA2011/050718, Nov. 18, 2011.

(Continued)

*Primary Examiner* — Kathy Wang-Hurst
(74) *Attorney, Agent, or Firm* — Brett J. Slaney; Blake, Cassels & Graydon LLP (57) ABSTRACT

A mobile device is associated with a user profile which includes one or more user interests. The device sends a request for identifying social groups in a mobile geographic location. In response to the request, the device receives data identifying a plurality of social group profiles corresponding to a plurality of social groups in the mobile geographic location. The mobile device presents a list of the social groups based on the received data, ranked in accordance with similarity scores. Each similarity score is produced based on both a proximity identified between the mobile and social group geographic locations, and similarities identified between the one or more user and group interests. In response to receiving a user input, the device may enter into the social group and present a chat session interface for a chat session for the selected social group.

20 Claims, 8 Drawing Sheets

(56) References Cited

U.S. PATENT DOCUMENTS

| | | |
|---|---|---|
| 2011/0137932 A1 | 6/2011 | Wable |
| 2011/0201358 A1* | 8/2011 | Karaoguz et al. .......... 455/456.3 |
| 2011/0225510 A1 | 9/2011 | Lavrov et al. |
| 2011/0238755 A1 | 9/2011 | Khan et al. |
| 2011/0238763 A1 | 9/2011 | Shin et al. |
| 2011/0299422 A1 | 12/2011 | Kim et al. |

OTHER PUBLICATIONS

Extended European Search Report dated Mar. 3, 2012 for EP application No. 11189716.1.

US 6,731,928, 05/2004, Tanaka (withdrawn)

* cited by examiner

SOCIAL NETWORKING METHODS AND APPARATUS FOR USE IN FACILITATING PARTICIPATION IN USER-RELEVANT SOCIAL GROUPS

BACKGROUND

1. Field of the Technology

The present disclosure relates generally to social networking methods and apparatus for mobile communication devices configured to operate in wireless communication networks, and more particularly to facilitating participation in user-relevant social groups for mobile communication devices.

2. Description of the Related Art

Computer systems may store vast amounts of data, and as a consequence it has become increasingly important to provide users with effective ways to locate information that is relevant to their interests. One area in which large amounts of information are involved is social networking.

Social networking systems allow users to designate other users as friends (or otherwise connect to or form relationships with other users), contribute and interact with media items, use applications, join groups, list and confirm attendance at events, create pages, and perform other tasks that facilitate social interaction. A social networking system is a good example of the demand for systems that help users locate relevant information from within a large set of information tracked or otherwise used by the system. However, locating information of particular relevance to a given user of a mobile communication device at any given time is more challenging.

A social networking system typically tracks a considerable amount of information about each user, which can be leveraged to identify items of relevance to a given user of a mobile communication device. However, the functionalities currently available in social networking systems do not fully leverage the information of the systems.

Other networks and environments may experience the same or similar issues. What are needed are methods and apparatus to overcome these and other related deficiencies of the prior art.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Techniques for use in facilitating participation in nearby user-relevant social groups for a mobile device are provided herein. The mobile device is associated with a user profile which includes one or more user interests of a user. In one illustrative example, the mobile device sends a request for identifying social groups in a mobile geographic location. Each social group is represented by a social group profile which includes a social group name, one or more social group interests, and a social group geographic location. In response to the request, the mobile device receives data identifying a plurality of social group profiles corresponding to a plurality of social groups in the mobile geographic location. The mobile device presents a list of the social groups based on the received data. The list of the social groups is ranked in accordance with similarity scores produced between the user and each social group. Each similarity score is produced based on both a proximity identified between the mobile and social group geographic locations, and similarities identified between the one or more user interests and the one or more social group interests. In response to receiving a user input for entering into one of the social groups, the mobile device may enter into the social group and present a chat session interface for a chat session for the selected social group.

Figure 1:
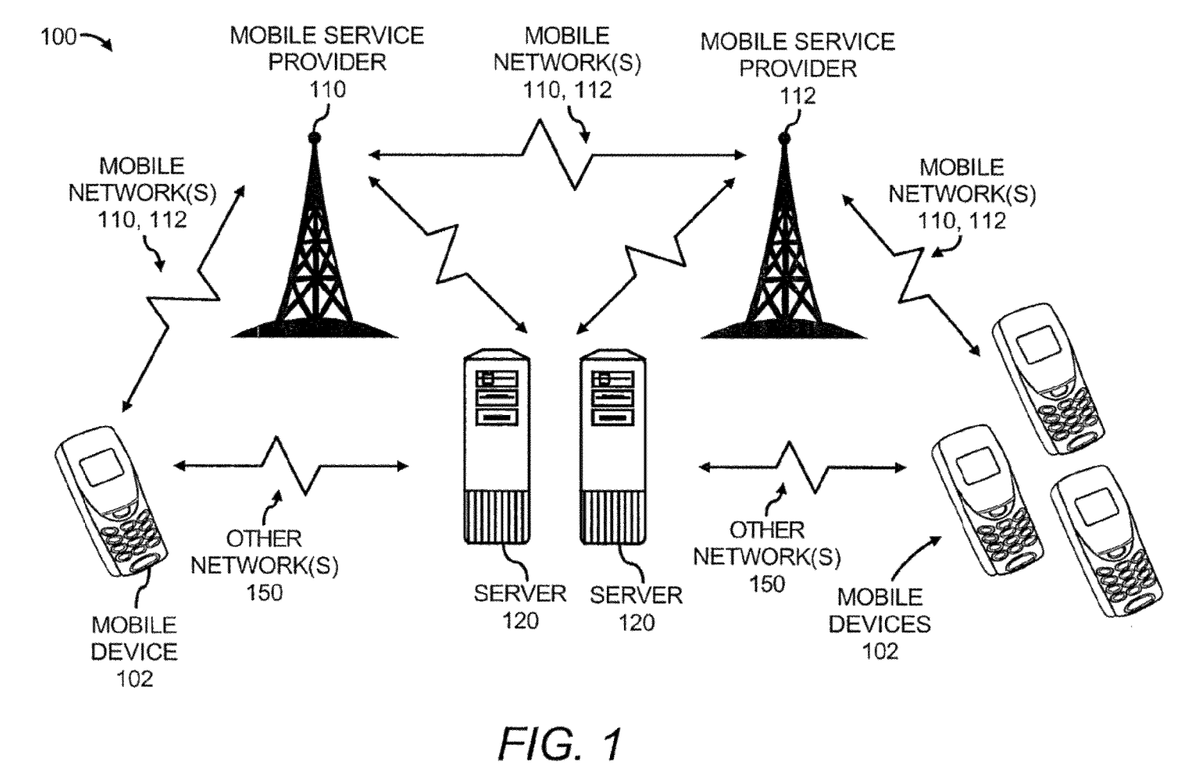
FIG. 1 is an illustration of a communication system within which a social network may be established amongst users of a plurality of mobile devices.

FIG. 1 is a schematic diagram of a communication system 100 in which a social network may be established amongst a plurality of mobile devices, according to an example. It should be understood that the communication system 100 may include additional elements and that some of the elements described herein may be removed and/or modified without departing from a scope of the communication system 100.

Communication system 100 includes a plurality of mobile communication devices 102, each device of which may be or include a mobile telephone or other such device through which users are able to place or receive voice calls. In addition, the mobile devices 102 may be or include wireless access protocol (WAP)-enabled devices that are configured to send and receive data over one or more mobile networks 110, 112 using the WAP, such as through CDMA, GSM, CDPD, PDC, PHS, TDMA, FLEX, ReFLEX, etc. The mobile devices 102 may also be or include devices that are able to communicate text messages, such as SMS (short message service) messages, enhanced SMS (EMS), multi-media messages (MMS), etc. The mobile devices 102 may operate on the same or different types of wireless mobile networks 110, 112.

Mobile devices 102 are configured to access one or more networks through a wireless connection with the mobile network(s) 110, 112 with one or more mobile service providers 110, 112. For example, a user may use one of the mobile devices 102 to connect to another user of another one of the mobile devices 102, in which the connection is facilitated through one or more of the mobile service providers 110, 112. Voice calls may be made over the mobile network(s) 110, 112 by the mobile devices 102, however the mobile devices 102 may additionally or alternatively be configured to make voice calls via other networks 150, such as the Internet. An example of this type of voice call is a Voice over Internet Protocol (VoIP) call.

The mobile devices 102 are also configured to communicate information to one or more servers 120. Server 120 is configured to establish a social network amongst a plurality of the mobile devices 102 using the information received from the mobile devices 102. In one embodiment, the mobile devices 102 are configured to communicate the information to the server 120 through the same mobile service provider(s) 110, 112 used for communication of voice and other data with other mobile devices 102. In another embodiment, the mobile devices 102 are configured to connect to the server 120 through other types of networks 150, such as a 3G network, a GPRS network, a GSM network, etc., or via Wi-Fi, WLAN networks, through an Internet connection, or otherwise.

Figure 2:
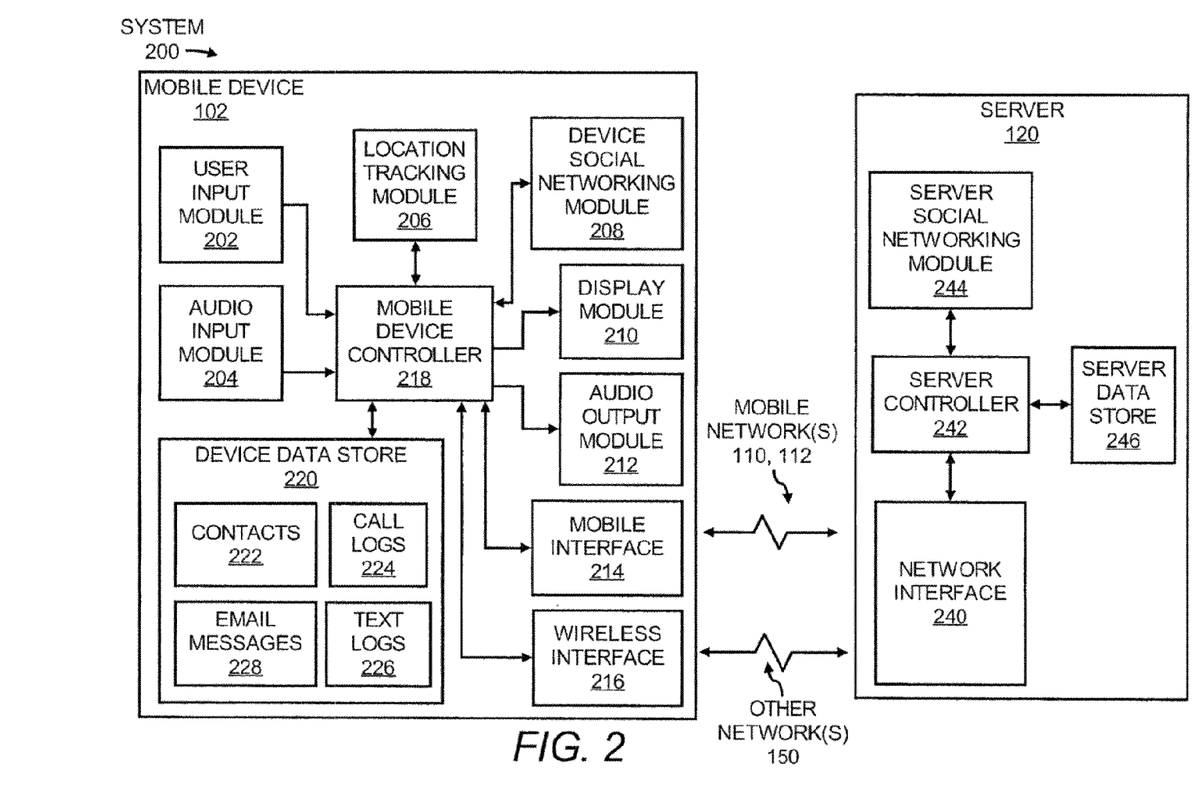
FIG. 2 is a schematic diagram of a part of the communication system of FIG. 1 for social networking amongst the users of the mobile devices.

FIG. 2 is a system 200 for social networking among users of mobile devices 102. It should be understood that the system 200 may include additional elements and that some of the elements described herein may be removed and/or modified without departing from a scope of the system 200. For example, the system 200 may include any number of mobile devices 102 and any number of servers 120.

As shown, the mobile device 102 includes a user input module 202, an audio input module 204, a location tracking module 206, a social networking module 208, a display module 210, an audio output module 212, a mobile interface 214, a wireless interface 216 (or radio frequency "RF" transceiver module), a controller 218, and a data store 220. The mobile device 102 may also include a microphone for receiving audio, a speaker for outputting audio, keys or a touchscreen for receiving inputs from a user, a display for displaying visual information, etc. In addition, the other mobile devices 102 in FIG. 1 may be similarly configured to the mobile device 102 in FIG. 2.

Note that the modules 202-212 may comprise software, firmware, and/or hardware. Thus, for example, one or more of the modules 202-212 may be or include software modules stored on one or more computer readable media, such as in the data store 220. Alternatively, one or more of the modules 202-212 may be or include one or more hardware modules, such as circuits, or other devices configured to perform various functions as described above below.

Mobile interface 214 and wireless interface 216 may comprise software, hardware, or a combination thereof to enable data in various forms to be communicated to and from the mobile device 102. For example, the mobile interface 214 enables voice and/or text data to be communicated over the mobile networks 110, 112 and the wireless interface 216 enables data, such as web-based data, to be communicated over one or more other networks.

The controller 218 may comprise a microprocessor, ASIC, or the like, configured to perform various computing operations in the mobile device 102. In one example, the controller 218 may be or include a chip or circuit employed in conventional mobile devices, such as cellular telephones, PDA's, etc. In another example, the controller 218 may be or include a chip or circuit specially configured to perform the various operations discussed herein. In a further example, the mobile device controller 218 may be or include a software program stored on a computer-readable storage medium and is configured to be implemented by a processor of the mobile device 102. The term "implement" may be considered as including an invoking or other operation throughout the present disclosure.

In any event, the controller 218 is configured to implement the user input module 202 to receive inputs from a user. In this regard, the user input module 202 is connected to one or more input devices, such as a numeric or alphanumeric keypad, a touchscreen display, or a pointing device, etc. The inputs may include, for example, input of telephone numbers, text messages, contact information, user profile preference information, etc.

The controller 218 is configured to implement the audio input module 204 to receive audio inputs from a user. In this regard, the audio input module 204 is connected to one or more audio input devices, such as an integrated microphone, a wired microphone, a wirelessly connected microphone (for example, a Bluetooth-enabled device), etc. The audio input module 204 may thus receive audio commands, such as voice activated dialing, etc., as well as voice input from a user during a telephone call through the mobile device 102.

The controller 218 is configured to implement the location tracking module 206 to receive positioning information of the mobile device 102. In one example, the location tracking module 206 is connected to a global positioning system (GPS) enabled device (e.g. GPS receiver) configured to automatically track its location through use of, for example, satellite or tower-based global positioning systems. In another example, the location tracking module 206 is connected to another type of device that is configured to determine the device's location within, for example, a city-level or better accuracy.

The controller 218 is configured to implement the social networking module 208 to perform various functions with respect to facilitating the participation in user-relevant social groups in the location of the mobile device. In one example, the device social networking module 208 is configured to order the nearby social groups based on a relative strength of the interests the user has with each social group and to cause the social groups to be displayed in the order based upon these relative relationship strengths. In addition, the device social networking module 208 is configured to order the nearby social groups based on a relative proximity of the location of the mobile device with each social group and to cause the social groups to be displayed in the order based upon these relative proximity strengths. Various other functions that the device social networking module 208 performs are described in greater detail herein below.

The controller 218 is configured to implement the display module 210 to output visual information to a user. In this regard, the display module 210 is connected to one or more displays, such as a visual display, a touch screen display, etc. The visual information displayed may include, for example, visual feedback of inputs provided by the user, contacts lists of the user grouped according to various factors, visual display of user preferences, visual display of images or video, information pertaining to the data received from the server 120, etc.

The controller 218 is configured to implement the audio output module 212 to output audio to a user. In this regard, the audio output module 212 is connected to one or more audio output devices, such as an integrated speaker, a wired speaker, a wirelessly connected speaker (for example, a Bluetooth™- enabled speaker device), etc. The audio output module 212 may thus output conversations from a caller to the mobile device 102, music stored in the device data store 220, etc.

The controller 218 may access information stored in the data store 220 in implementing one or more of the modules 202-212. Although the data store 220 may store additional types of information, the device data store 220 is depicted as storing information pertaining to contacts 222, call logs 224, text messaging logs 226 (such as SMS, EMS, MMS, etc.), and email messages 228 for purposes of illustration. The social networking module 208 may track the call logs 224, such as telephone number dialed, call duration, and time of call, the text messaging logs 226, and changes to the contacts 222 and may communicate the tracked data to the server 120, as discussed in greater detail herein below. The data store 220 may comprise volatile and/or non-volatile memory, such as DRAM, EEPROM, MRAM, flash memory, and the like. In addition, or alternatively, the data store 220 may comprise a device configured to read from and write to a removable media, such as a floppy disk, a CD-ROM, a DVD-ROM, or other optical or magnetic media.

As shown in FIG. 2, the server 120 is depicted as including a network interface 240, a server controller 242, a server 242, a social networking module 244, and a data store 246. The social networking module 244 may comprise software, firmware, and/or hardware. Thus, for example, the social networking module 244 may be or include a software module stored on a computer readable medium, such as in the data store 246. Alternatively, the social networking module 244 may be or include a hardware module, such as a circuit, or other device configured to perform various functions as described below.

The network interface 240 may be or include software, hardware, or a combination thereof, to enable data in various forms to be communicated to and from the server 120. For example, the network interface 240 enables data to be communicated to and from the server 120 over one or more of the mobile networks 110, 112 and/or over one or more of the other networks 150, such as the Internet. In one example, the server 120 may receive data containing the tracked call logs 224 as well as other information from a user's mobile device 102, through a connection to the mobile device 102 over a mobile network 110 and/or through an Internet connection.

The server controller 242 may comprise a microprocessor, ASIC, or the like, configured to perform various computing operations in the server 120. In one example, the server controller 242 may be or include a chip or circuit employed in a conventional server. In another example, the server controller 242 comprises a chip or circuit specially configured to perform the various operations discussed herein. In a further example, the server controller 242 comprises a software program stored on a computer-readable storage medium and is configured to be implemented by a processor of the server 120.

The server controller 242 is configured to implement the server social networking module 244 to perform various functions with respect to facilitating participation in user-relevant social groups. The various functions performed by the social networking module 244 are described in greater detail herein below.

The server controller 242 may store information received from the mobile devices 102 and may also store various other information pertaining to implementation of the server social networking module 244 in the server data store 246. The server data store 246 may comprise volatile and/or non-volatile memory, such as DRAM, EEPROM, MRAM, flash memory, and the like. In addition, or alternatively, the server data store 246 may comprise a device configured to read from and write to a removable media, such as a floppy disk, a CD-ROM, a DVD-ROM, or other optical or magnetic media.

In its server data store 246, the server 120 may have access to and store a plurality of profiles for social networking. The plurality of profiles include a plurality of user profiles and a plurality of social group profiles. These profiles may be created by any user in the system, such as by the user of the mobile device 102.

When the user of the mobile device 102 creates a user profile, the user input module 202 receives user profile information and preferences from the user. The user profile information may include, for example, information that the user would like to display to other users, such as the user's name and other biographical information, such as a personal photograph, birth date, educational background, marital status, employment information, etc. The user profile information may also include one or more interests and/or activities of the user. The preferences may include, for example, the types of information that the server 120 provides to various users. The preferences may also include instructions on the types of information that the server 120 provides to users depending upon whether the users are in particular groups, such as friends, family, colleagues, etc. For example, the user may indicate preferences for a private profile, which is displayed to other users grouped with the user, and a public profile, which is displayed to other users outside of the user's groups.

In one example, the social networking module 208 of mobile device 102 may cause a listing of questions pertaining to the user profile and preferences to be displayed on a screen of the mobile device 102. In this example, the social networking module 208 may have a standardized manner of receiving the user profile information and preferences. According to another example, the user may input the information pertaining to the user profile and preferences through use of a Web-based application.

Figure 11:
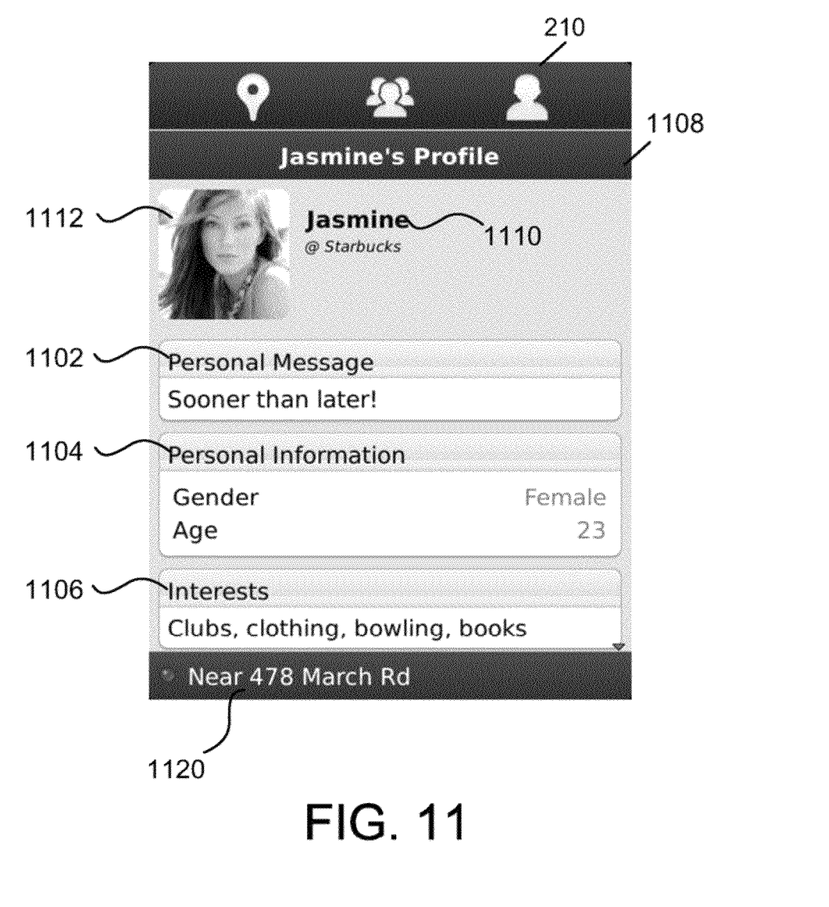
FIG. 11 is an illustrative example of the display module which is providing a presentation of a user profile of a user of the social group.

One example of a user profile 1108 of a user which is displayed in display 210 is provided in FIG. 11. User profile 1108 includes a user name 1110 ("Jasmine"), a user (photo) image 1112, a status or personal message 1102 ("Sooner than later!"), biographical information 1104 which includes gender ("Female") and age ("23"), and user interests 1106 ("Clubs, clothing, bowling, books"). A (mobile) geographic location 1120 of the user is also indicated in the user profile 1108 ("near 478 March Rd").

Social group profiles may also be created by any user in the system, such as by the user of the mobile device 102. When the user of the mobile device 102 creates a social group profile, the user input module 202 receives group profile information and preferences from the user. The social group profile information may include, for example, information that the user would like to display to other users, such as the social group's name, a social group (photo) image, and one or more interests and/or activities of the social group. The preferences may include, for example, the types of information that the server 120 provides to various users. A social group geographic location of the social group may also be indicated in the social group profile. In one example, the social group profile includes at least a social group name of the social group, one or more social group interests or activities of the social group, and a social group geographic location of the social group.

Figure 3:
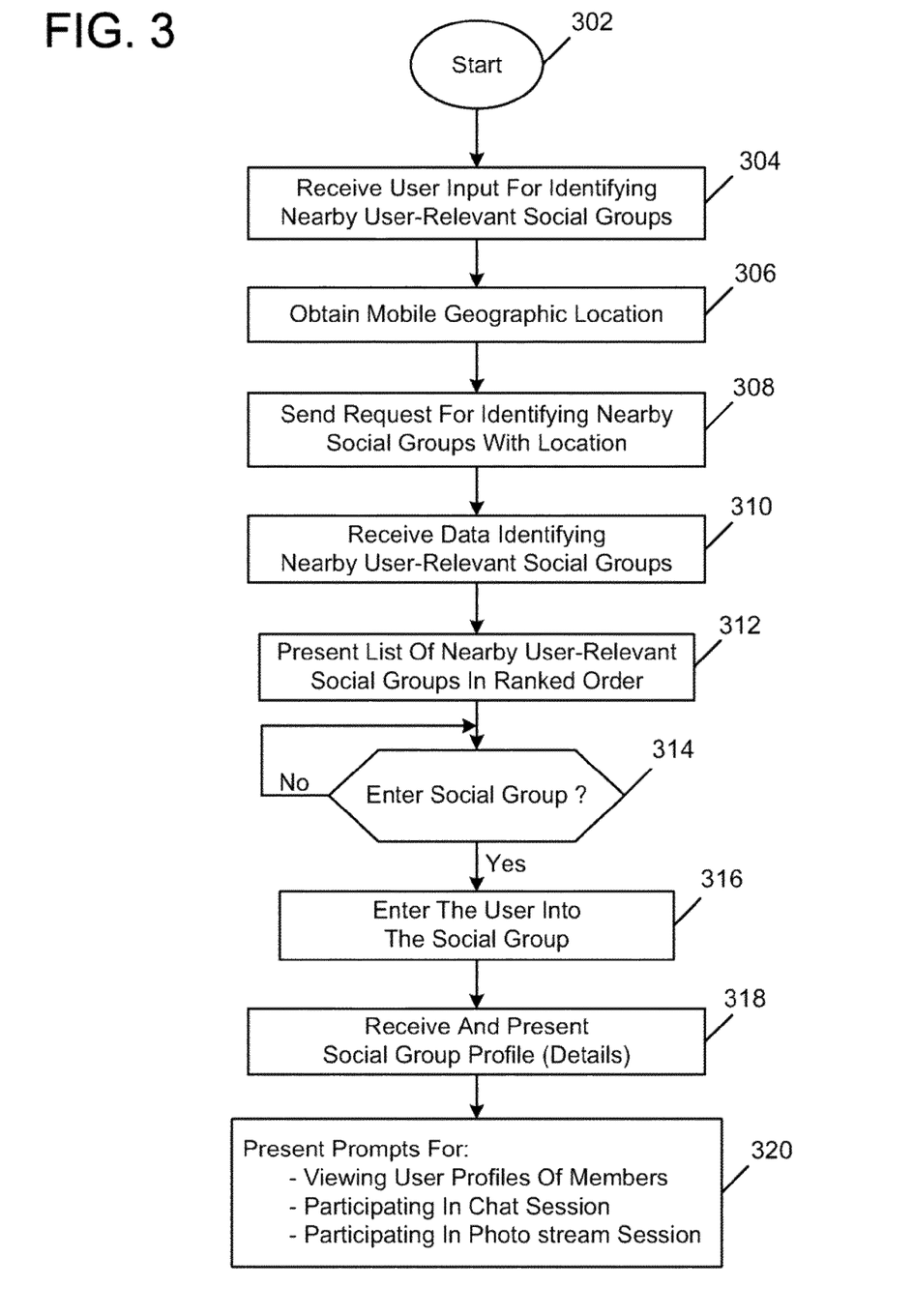
FIG. 3 is a flowchart of a method in a mobile communication device for use in facilitating participation in nearby user-relevant social groups for the mobile communication device.

FIG. 3 is a flowchart of a method of operating the mobile device 102 for facilitating the participation of user-relevant social groups for the mobile device 102. Most if not all social networking functions described in this flowchart may be performed by device social networking module 208 in connection with the mobile device controller 218. It should be apparent to those of ordinary skill in the art that the method of FIG. 3 represents a general illustration and that other steps may be added, or existing steps be removed, modified or rearranged, without departing from a scope of the method of FIG. 3. The description of FIG. 3 is made with reference to the mobile device 102 of FIG. 2, and thus makes reference to the elements cited therein. It should, however, be understood that the method of FIG. 3 is not limited to the elements set forth in the mobile device 102. Instead, it should be understood that the method of FIG. 3 may be practiced by a system having a different configuration than that set forth in the mobile device 102.

Beginning at a start block of FIG. 3, the mobile device 102 receives via the user input module 202 a user input which comprises a request for identifying nearby user-relevant social groups (step 304 of FIG. 3). This request is for identifying social groups that are relevant the user of the mobile device 102 and also nearby its location. In response to the request, the mobile device 102 causes location tracking module 206 to obtain a mobile geographic location of mobile device 102 (step 306 of FIG. 3). This may be done with use of global positioning system (GPS) technologies. In one example, the mobile geographic location is the current real-time geographic location of the mobile device 102.

Once the location is obtained, the mobile device 102 sends via the mobile interface 214 a request for identifying the nearby user-relevant social groups (step 308 of FIG. 3). This request may include the mobile geographic location obtained from step 306. In response to this request, the mobile device 102 receives via the mobile interface 214 data which identify a plurality of social group profiles corresponding to the nearby user-relevant social groups (step 310 of FIG. 3). The data may indicate, for example, at least the social group names of the social groups. Based on the received data, the mobile device 102 presents in display module 210 a list of the nearby user-relevant social groups (step 312 of FIG. 3). The list may indicate at least the social group names of the social groups. The list may further be provided as a list of headers, where each header includes the social group name of the social group. An example of such a list is provided in FIG. 5 which is described later below.

The social groups in the list are presented in a ranked order. More particularly, the social groups are ranked in accordance with similarity scores between the user and each social group. Each similarity score is produced or calculated at the server 120 based on both a proximity identified between the mobile and social group geographic locations and similarities identified between the user and the social group profile information (e.g. the user and the social group interests/activities). Each similarity score may be further produced or calculated at the server 120 based on similarities identified between the user profile information of the user and the user profile information of some or all of the existing members of the social group (e.g.

the user bibliographic information and the user bibliographic information of some or all of the members of the social group, and/or the user interests/activities of the user and the user interest/activities of some or all of the members of the social group). Thus, the closer the location of the mobile device 102 to the location of the social group, the higher the ranking of the social group, and accordingly the higher the position of the social group in the list. Also, the closer and/or more similarities between the user and the social group profile information, the higher the ranking of the social group, and accordingly the higher the position of the social group in the list. Even further, the closer and/or more similarities between the user profile information of the user and the user profile information of some or all of the existing members of the social group, the higher the ranking of the social group, and accordingly the higher the position of the social group in the list.

The user input module 202 of mobile device 102 then may receive a user input comprising a request for entering or checking into one of the social groups which are indicated in the displayed list (step 314 of FIG. 3). In response, the mobile device 102 sends a request for entering or checking into the selected social group. Thereafter, the user is entered or checked into the selected social group (step 316 of FIG. 3). Note that entry into more than one social group at the same time is made available by the system. In response to being entered or checked into the selected social group, the user is permitted access to view and process functions associated with the social group. In addition, notifications are sent to users or members of the social group regarding the check in of the user. In addition, the user profile information of the user of the mobile device 102 is shared with the users members of the social group and communications access is facilitated (e.g. via steps 318 and 320 below).

An input prompt for entering or checking into the social group may be presented in the list of nearby user-relevant social groups and/or within the social group profile. An actuation of the input prompt for entering or checking into the social group causes the user to be entered or checked into the social group. Additionally or alternatively, when the mobile device 102 enters into the location of the social group, or moves within a predetermined distance within the location of the social' group, the user of the mobile device 102 may be automatically entered or checked into the social group.

The input prompt for entering or checking into the social group may be suppressed from the presentation if the user is not a member of or has not yet joined the social group, and/or the mobile device 102 is not located at the social group geographic location. Alternatively, if the user is not a member of or has not yet joined the social group, instead of presenting the input prompt for entering or checking into the social group, an input prompt for joining the social group as a member may be presented in the list of nearby user-relevant social groups and/or within the social group profile.

The actuation of the input prompt for joining the social group causes the sending via the mobile interface 214 of a request to join the social group. Once approved by one of the members (e.g. by the creator of the social group), the user of the mobile device 102 becomes a member of the social group and the user profile information of the user is shared with the users members of the social group.

Prior to and/or after checking into the social group, the mobile device 102 may receive via the mobile interface 214 data associated with the social group profile, and present in display module 210 social group profile information based on the received data (step 318 of FIG. 3). One example of the presentation of such social group profile information is provided in FIGS. 6-7 ("Group Details") which is described later below. The mobile device 102 also presents in display module 210 a plurality of input prompts for processing of one or more social group functions (step 320 of FIG. 3). These input prompts may be provided together in the same presentation as the social group profile information. An example of the presentation of such input prompts is provided in FIGS. 6-7 which is described later below.

One type of input prompt may be, for example, an input prompt for viewing user profiles of members of the social group. In response to receiving a user input which selects the input prompt for viewing user profiles, the mobile device 102 sends via the mobile interface 214 a request for, and receives via the mobile interface 214 in response, data for presenting in display module 210 a list of user profiles of the entered members of the social group. The list may be provided as a list of headers, where each header includes the user name associated with the user profile. In response to receiving a user input which selects one of the user profiles, the mobile device 102 sends via the mobile interface 214 a request for, and receives via the mobile interface 214 in response, data for presenting in display module 210 the selected user profile. An example of such a user profile is provided in FIG. 11.

Another type of input prompt may be an input prompt for participating in a chat session with members of the social group. In response to receiving a user input which selects the input prompt for participating in the chat session, the mobile device 102 presents in display module 210 a chat session interface for a chat session involving the members of the social group. An example of the presentation of such a chat session interface is provided in FIG. 9 which is described later below.

Yet another type of input prompt may be an input prompt for participating in a photostream session with members of the social group. In response to receiving a user input which selects the input prompt for participating in the photostream session, the mobile device 102 presents in display module 210 a photostream session interface for a photostream session involving the members of the social group. An example of the presentation of such a photostream session interface is provided in FIG. 10 which is described later below, or may be the similar or the same as that provided in relation to FIG. 9 which is also described later below.

An input prompt for leaving or exiting the social group may be presented in the social group profile and/or in the list of nearby user-relevant social groups. An actuation of the input prompt for leaving or exiting the social group causes the exiting or checking out of the social group by the user of the mobile device 102. Additionally or alternatively, when the mobile device 102 leaves the location of the social group that has been entered, or moves a predetermined distance away from the location of the social group, the user of the mobile device 102 may be automatically exited or checked out of the social group. In response to the user exiting or checking out of the social group, notifications are sent to users or members of the social group regarding the user's exiting or checking out. In addition, the user profile information of the user of the mobile device 102 may no longer be shared with the members of the social group and communication access with the user is no longer facilitated.

The social networking module 208 may repeat steps of the method of FIG. 3 in a regular or periodic manner and/or as changes to the information are received to update the information in the server 120 and to continuously receive data from the server 120.

Figure 4:
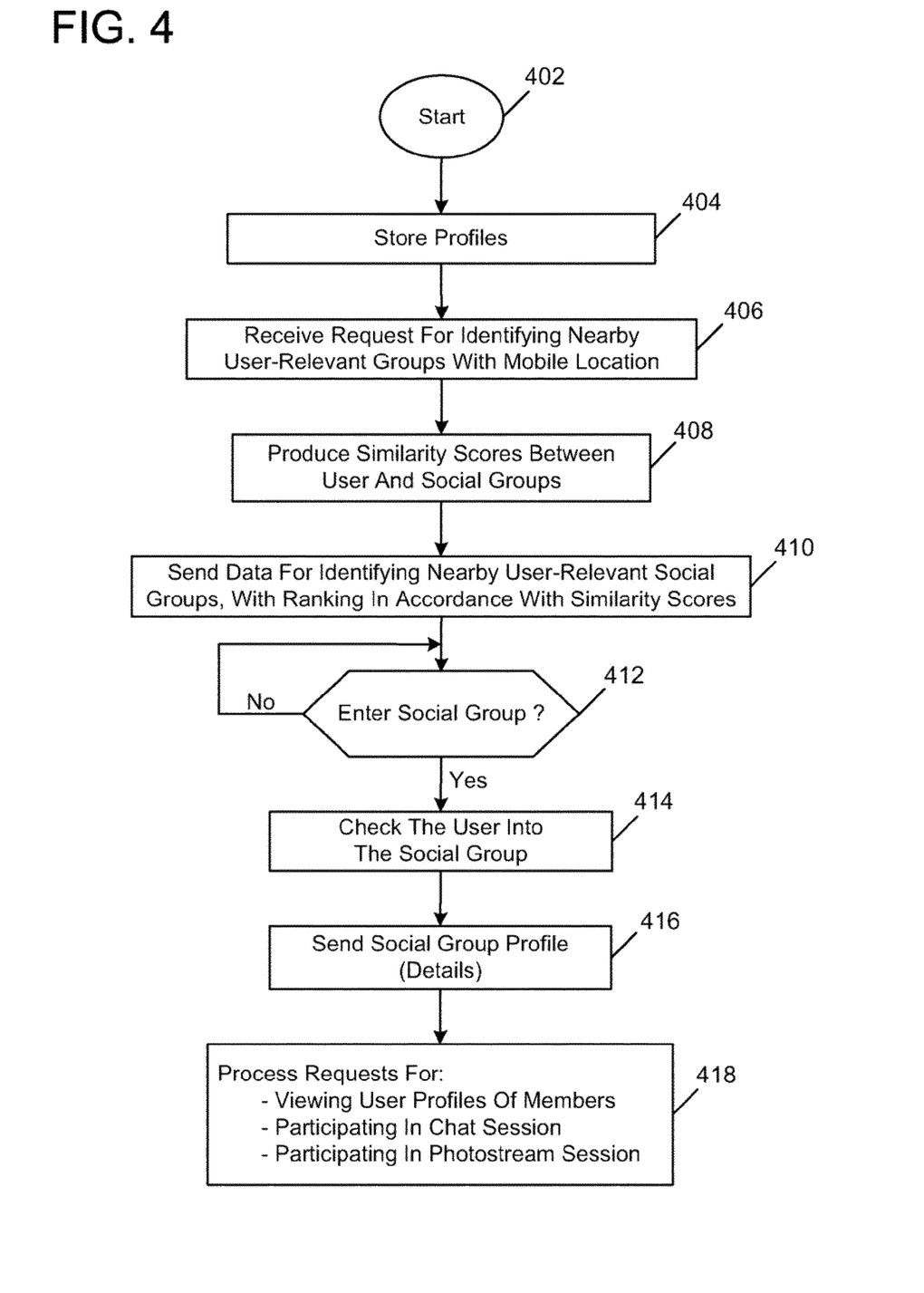
FIG. 4 is a flowchart of a method in a social networking server for use in facilitating participation in nearby user-relevant social groups for mobile communication devices.

FIG. 4 is a flowchart of a method of operating a server 120 for facilitating the participation in nearby user-relevant social groups for mobile devices such as the mobile device 102, which compliments or corresponds to the method of FIG. 3 of the mobile device 102. Most if not all social networking functions described in this flowchart may be performed by server social networking module 244 in connection with the server controller 242.

It should be apparent to those of ordinary skill in the art that the method of FIG. 4 represents a generalized illustration and that other steps may be added or existing steps may be removed, modified or rearranged without departing from a scope of the method. The description of FIG. 4 is made with reference to the server 120 of FIG. 2, and thus makes reference to the elements cited therein. It should, however, be understood that the method is not limited to the elements set forth in the server 120. Instead, it should be understood that the method may be practiced by a system having a different configuration than that set forth in the server 120.

Beginning at a start block 402 of FIG. 4, the server 120 may have access to and store a plurality of profiles in its server data store 246 (step 404 of FIG. 4). The plurality of profiles include a plurality of user profiles and a plurality of social group profiles. As described earlier, these profiles may be created by any user in the system, such as by the user of the mobile device 102. The user profile information may include, for example, information that the user would like to display to other users, such as the user's name and other biographical information, such as a personal photograph, birth date, educational background, marital status, employment information, etc. The user profile information may also include one or more interests and/or activities of the user. The preferences may include, for example, the types of information that the server 120 provides to various users. The preferences may also include instructions on the types of information that the server 120 provides to users depending upon whether the users are in particular groups, such as friends, family, colleagues, etc. For example, the user may indicate preferences for a private profile, which is displayed to other users grouped with the user, and a public profile, which is displayed to other users outside of the user's groups. See FIG. 11 for an example of user profile 1108 of a user which is displayed in display module 210, which is described earlier above.

Social group profiles may also be created by any user in the system, such as by the user of the mobile device 102. In such case, the user input module 202 receives group profile information and preferences from the user. The social group profile information may include, for example, information that the user would like to display to other users, such as the social group's name, a social group (photo) image, and one or more interests and/or activities of the social group. The preferences may include, for example, the types of information that the server 120 provides to various users. A social group geographic location of the social group may also be indicated in the social group profile. In one example, the social group profile includes at least a social group name of the social group, one or more social group interests or activities of the social group, and a social group geographic location of the social group.

The server 120 receives, from the mobile device 102 which is associated with a user, a request for identifying the nearby user-relevant social groups (step 406 of FIG. 4). This request may include the mobile geographic location of the mobile device 102. In response, the server 120 produces a similarity score between the user and each social group (step 408 of FIG. 4). Each similarity score is produced or calculated by the server 120 based on both a proximity identified between the mobile and social group geographic locations and similarities identified between the user and the social group profile information (e.g. the user and social group interests or activities). Each similarity score may be further produced or calculated by the server 120 based on similarities identified between the user profile information of the user and the user profile information of some or all of the users (members) of the social group (e.g. the user bibliographic information and the user bibliographic information of some or all of the members of the social group, and/or the user interests/activities of the user and the user interest/activities of some or all of the members of the social group).

Thereafter, the server 120 sends via the network interface 240 data to which identify a plurality of social group profiles corresponding to the nearby user-relevant social groups (step 410 of FIG. 4). The data may indicate, for example, at least the social group names of the social groups. The data which identify the nearby user-relevant social groups are provided in a sorted order in accordance with similarity scores between the user and each social group. Note that, at the mobile device 102, a list of these nearby user-relevant social groups will be presented in a ranked order. The list may indicate at least the social group names of the social groups. The list may further be provided as a list of headers, where each header includes the social group name of the social group. An example of such a list is provided in FIG. 5 which is described later below.

Thus, the closer the location of the mobile device 102 to the location of the social group, the higher the ranking of the social group, and accordingly the higher the position of the social group in the list. Also, the closer and/or more similarities between the user and the social group profile information (e.g. the user and the social group interests), the higher the ranking of the social group, and accordingly the higher the position of the social group in the list. Even further, the closer and/or more similarities between the user profile information of the user and the user profile information of some or all of the members of the social group, the higher the ranking of the social group, and accordingly the higher the position of the social group in the list.

The server 120 receives from the mobile device 102 via the network interface 240 a request for entering into one of the social groups (step 412 of FIG. 4). In response, the server 120 checks or enters the user of the mobile device 102 into the selected social group (step 414 of FIG. 4). In response to the mobile device 102 being entered or checked into the social group, the server 120 permits access to viewing and processing functions associated with the social group. In addition, notifications are sent to users or members of the social group regarding the check in of the user.

Note that an input prompt for entering or checking into the social group may be presented in the list of nearby user-relevant social groups, and/or within the social group profile. An actuation of the input prompt for entering or checking into the social group causes the mobile device 102 to send the request for entering into one of the social groups, and subsequently for the user to be entered or checked into the social group by the server 120. Additionally or alternatively, when the mobile device 102 enters into the location of the social group, or moves within a predetermined distance within the location of the social group, the server 120 may automatically enter or check the user of the mobile device 102 into the social group.

The input prompt for entering or checking into the social group may be suppressed from the presentation if the user is not a member of or has not yet joined the social group, and/or the mobile device 102 is not located at the social group geographic location. Alternatively, if the user is not a member of or has not yet joined the social group, instead of presenting the input prompt for entering or checking into the social group, an input prompt for joining the social group as a member may be presented in the list of nearby user-relevant social groups and/or within the social group profile. The actuation of the input prompt for joining the social group causes the mobile device 102 to send a request to join the social group, which is received by the server 120. Once approved by one of the members (e.g. by the creator of the social group), the server 120 causes the user of the mobile device 102 to become a member of the social group and allows the user profile information of the user to be shared with the other members of the social group.

Prior to and/or after the user checks into the social group, the server 120 sends via the network interface 240 data associated with the social group profile for the mobile device 102 to present in its display module 210 (step 416 of FIG. 4). An example of the presentation of such social group profile information is provided in FIGS. 6-7 which is described later below. The data associated with the social group profile also provides a presentation for a plurality of input prompts for processing of one or more social group functions. These input prompts may be provided together in the same presentation as the social group profile information. An example of the presentation of such input prompts is provided in FIGS. 6-7 which is described later below. The server 120 may then process requests for the various social group functions (step 418 of FIG. 4).

One type of function may be, for example, a function for viewing user profiles of members of the social group. In response to the mobile device's receiving of a user input which selects the Input prompt for viewing user profiles, the server 120 receives from the mobile device 120 via the network interface 240 a request for a list of user profiles for the entered members of the social group. The server 120 sends via the network interface 240 data indicating the list of user profiles of the entered members of the social group, so that the mobile device 102 may present the list in its display module 210. The list may be provided as a list of headers, where each header includes the user name associated with the user profile. Subsequently, in response to the mobile device's receiving of a user input which selects one of the user profiles, the server 120 receives from the mobile device 120 via the network interface 240 a request for the selected user profile. The server 120 sends via the network interface 240 the user profile information of the selected user profile, so that the mobile device 102 may present it in its display module 210. An example of the presentation of such a user profile is provided in FIG. 11, which was described earlier above.

Another type of function may be a function for participating in a chat session with members of the social group. In response to the mobile device's receiving of a user input which selects the input prompt for participating in the chat session, the server 120 receives from the mobile device 120 via the network interface 240 a request for entering into the chat session and causes the user of the mobile device 102 to be entered into the chat session. Thereafter, the mobile device 102 presents in display module 210 a chat session interface for a chat session involving the members of the social group. Messages (e.g. text or instant messages) amongst the members of the social group are communicated and displayed in the chat session interface. An example of the presentation of such a chat session interface is provided in FIG. 9 which is described later below.

Yet another type of function may be a function for participating in a photostream session with members of the social group. In response to the mobile device's receiving of a user input which selects the input prompt for participating in the photostream session, the server 120 receives from the mobile device 120 via the network interface 240 a request for entering into the photostream session and causes the user of the mobile device 120 to be entered into the photostream session. Thereafter, the mobile device 102 presents in display module 210 a photostream session interface for a photostream session involving the members of the social group. Photo images amongst the members of the social group are communicated and displayed in the photostream interface. An example of the presentation of such a photostream session interface is provided in FIG. 10 which is described later below, or may be the similar or the same as that provided in relation to FIG. 9 which is also described later below.

FIGS. 5-11 are illustrative examples of display module 210 of the mobile device 102 which provide various display presentations described in relation to the techniques of FIGS. 3-4 above.

Figure 5:
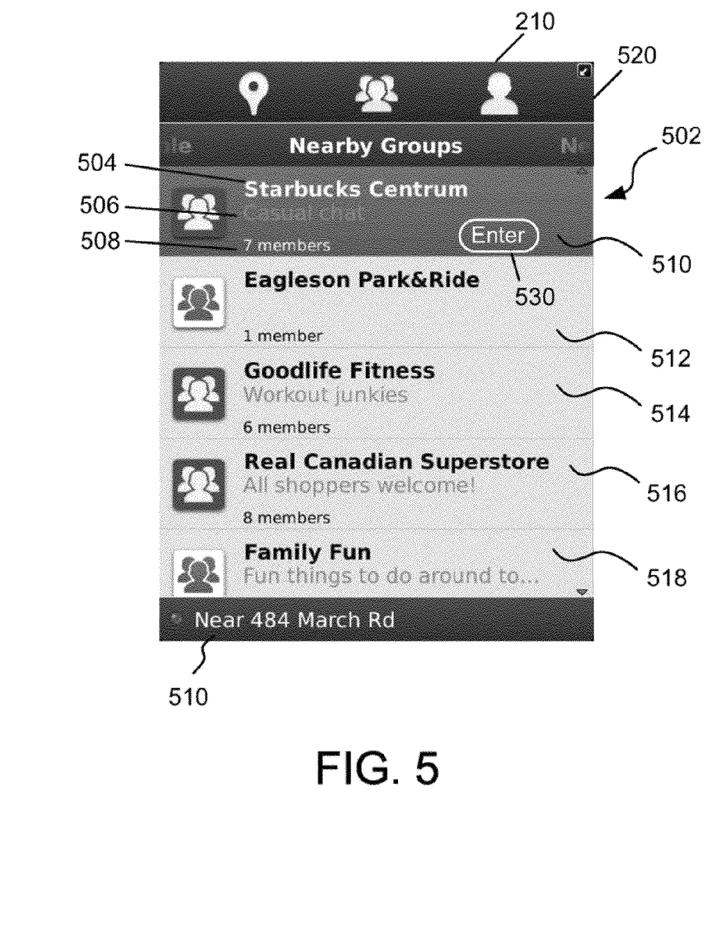
FIG. 5 is an illustrative example of a display module of the mobile communication device, which is providing a presentation of a list of nearby user-relevant social groups which are ranked in accordance with similarity scores between the user and each social group.

More particularly, in relation to FIG. 5, what is presented in, display module 210 is a list 502 of nearby user-relevant social groups (relevant to step 312 of FIG. 3 and step 410 of FIG. 4). In this example, the list 502 includes five (5) nearby user-relevant social groups, including social groups 510, 512, 514, 516, and 518 (in that order, from top to bottom). Above these listed social groups is an indication 520 of the general purpose of the list ("Nearby Groups"). Each entry in the list 502 corresponds to one of the social groups 510, 512, 514, 516, and 518 in the location, and may be or be referred to as a header. Each entry in the list 502 includes a social group name 504 (e.g. "Starbucks Centrum"), a social group interest 506 or description ("Casual Chat"), and the number of members 508 ("7 members"). The mobile device 102 may be entered into more than one social group at the same time. Also provided is an input prompt 530 for entering into the social group, an actuation of which causes the user of the mobile device 102 to be entered into the social group. A mobile geographic location 510 ("Near 484 March Road") of the mobile device 102 is also provided in the presentation.

Social groups in the list 502 of FIG. 5 are presented in a ranked order. In this example, social group 510 is the ranked the highest in the list. More particularly, the social groups are ranked in accordance with similarity scores between the user and each social group. The closer the location of the mobile device 102 to the location of the social group, the higher the ranking of the social group, and accordingly the higher the position of the social group in the list 502. Also, the closer and/or more similarities between the user and the social group profile information (e.g. the user and the social group interests), the higher the ranking of the social group, and accordingly the higher the position of the social group in the list 502. Even further, the closer and/or more similarities between the user profile information of the user and the user profile information of some or all of the members of the social group, the higher the ranking of the social group, and accordingly the higher the position of the social group in the list 502.

Indicators are provided in the list 502 to distinguish between the different real-time statuses of the social groups relative to the user. In one embodiment, there are three (3) different statuses and indicators for social groups which are provided for the user: (1) a social group that the user is both a member of (i.e. having joined and been approved) and is located at or within a predetermined distance from the social group geographic location; (2) a social group that the user is a member of (i.e. having joined and been approved) but is not located at, or is outside of, the predetermined distance from the social group geographic location; (3) a social group that the user is not yet a member of (i.e. not yet joined or approved). The indicators may be in the form of color codes in the list 502 of FIG. 5. For example, the color codes may be as follows: color code of green=status (1); color code of red=status (2); and color code of grey=status (3). These indicators may be provided on the image icons for the social groups. In the example of FIG. 5, social group 510 has the color code of green=status (1); social groups 514 and 516 have the color codes of red=status (2); and social groups 512 and 518 have the color codes of grey=status (3).

Figure 6:
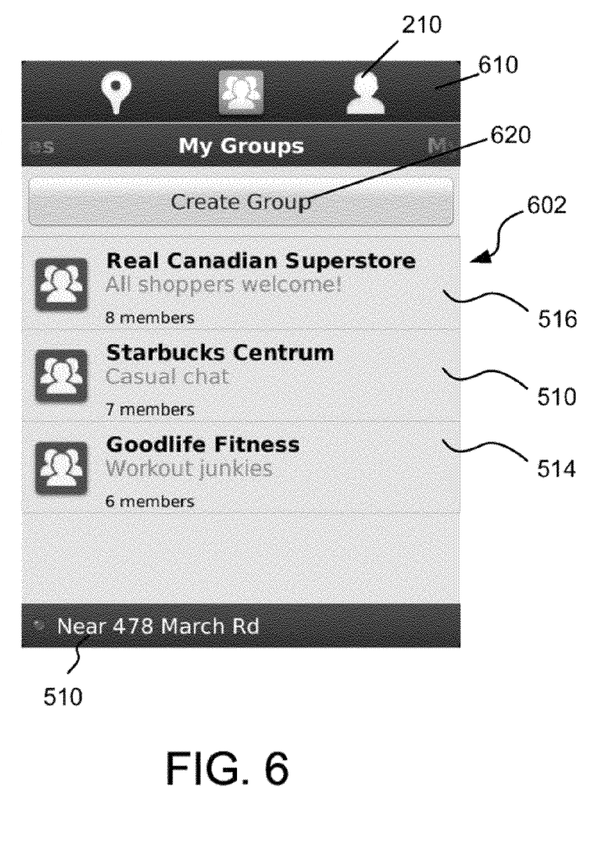
FIG. 6 is an illustrative example of the display module which is providing a presentation of a list of social groups of which the user is a joined member.

In FIG. 6, what is presented in display module 210 is a list 602 of social groups of which the user is merely a member or has joined. In this example, the list 502 includes three (3) social groups, including social groups 516, 510, and 514 (in that order from top to bottom) from FIG. 5. In comparison to FIG. 5, this list 602 is not provided in a ranked order based on similarity scores between the user and each social group. Above the listed social groups is an indication 610 of the general purpose of the list ("My Groups"). Each entry in the list 602 corresponds to one of the social groups 516, 510, and 514, and may be or be referred to as a header. Each entry in the list 502 includes a social group name, a social group interest, and the number of members. Also provided is an input prompt 620 for creating a new social group, an actuation of which causes the creation of a new social group by the user. The mobile geographic location 510 ("Near 484 March Road") of the mobile device 102 is also provided in the presentation.

Figure 7:
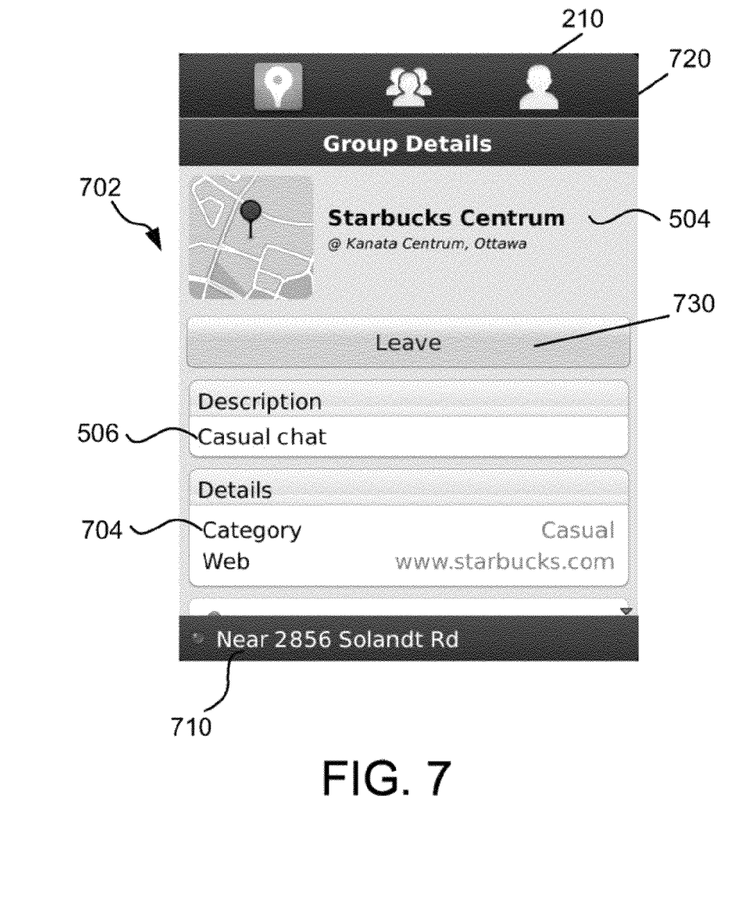
FIG. 7 is an illustrative example of the display module which is providing a first partial presentation of details of one of the selected social groups that the user has entered into.
Figure 8:
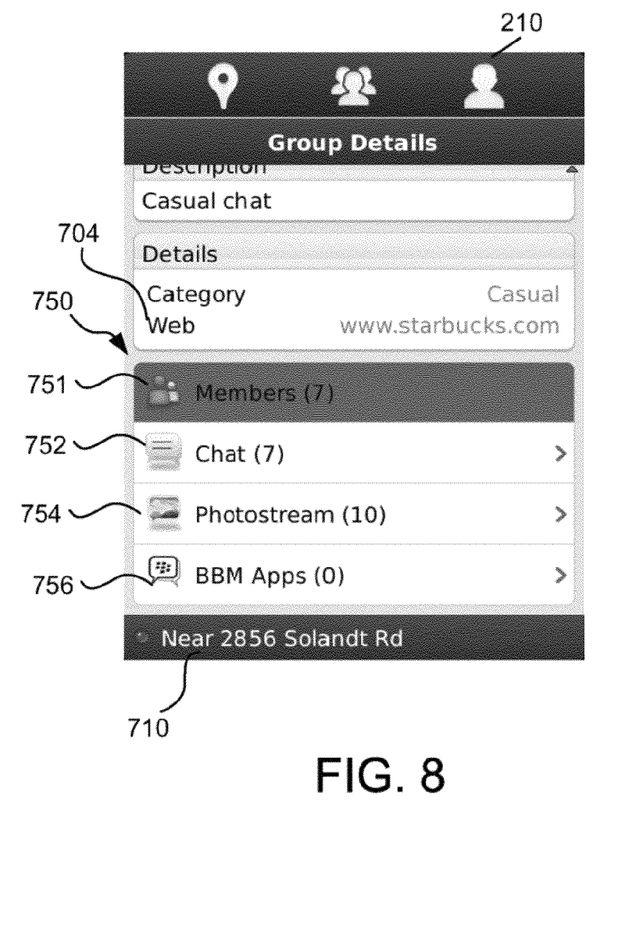
FIG. 8 is an illustrative example of the display module which is providing a second partial presentation of details of the selected social group that the user has entered into.

In FIGS. 7-8, what is presented in display module 210 is a social group profile 702 or details (see e.g. step 318 of FIG. 3 and step 416 of FIG. 4). The presentation is presented in two parts, where FIG. 7 is the upper part of the presentation and FIG. 8 is the lower part of the presentation (e.g. from scrolling down in the presentation). An indication 720 of the general purpose of the presentation ("Group Details") is provided along with the group profile information. The social group details includes one or more social group interests 506 or description, and additional details 704 including a category ("Casual") and a server site address associated with the social group ("www.starbucks.com"). Further provided is a social group geographic location 710 ("Near 2856 Solandt Rd") corresponding to the location of the social group. Also provided is an input prompt 730 for leaving or exiting the social group, an actuation of which causes the leaving or exiting of the social group by the user.

Also presented are a plurality of input prompts 750 for processing of one or more social group functions (relevant to step 320 of FIG. 3 and step 418 of FIG. 4). These input prompts 750 are provided together in the same presentation as the social group profile information. In this example, the input prompts include an input prompt 751 for viewing user names and/or user profiles of the members of the social group, an input prompt 752 for participating in a chat session with the members of the social group (see e.g. FIG. 9 as described below), an input prompt 754 for participating in a photostream session with the members of the social group (see e.g. FIG. 10 as described below), and an input prompt 756 for sharing contact information in relation to one or more communication applications with the members of the social group. Actuation of these input prompts 750 will cause the corresponding functions to be processed, as described earlier.

Figure 9:
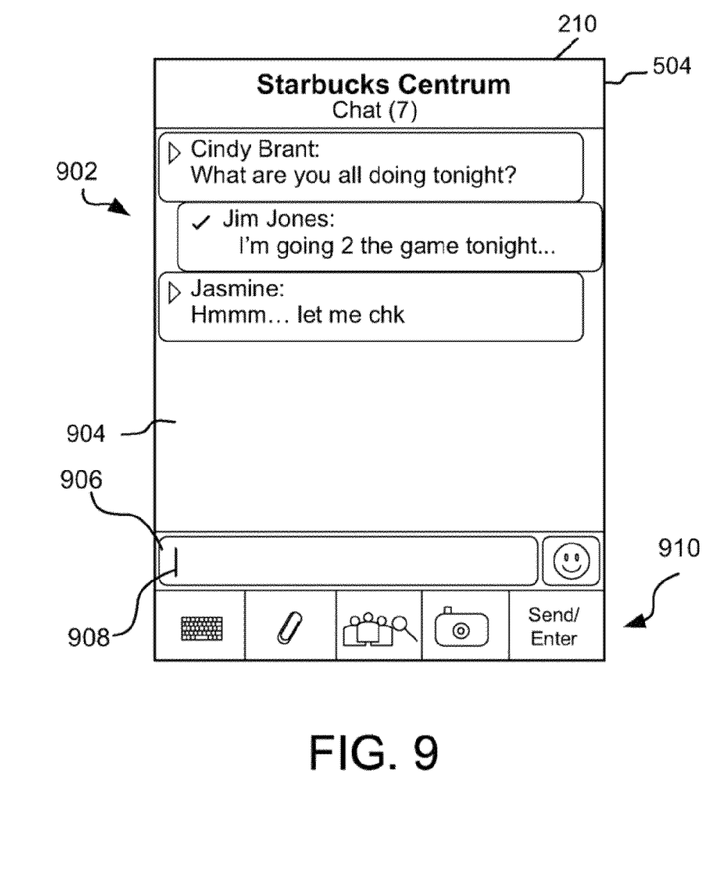
FIG. 9 is an illustrative example of the display module which is providing a chat session interface for a chat session (e.g. a text-based and/or instant messaging session) involving members of the selected social group that the user has entered into.

In FIG. 9, what is presented in display module 210 is a chat session interface for a chat session amongst the members of the social group. The chat session may be entered in response to an actuation of the associated input prompt (see e.g. FIG. 8 described above). In this example, the chat session interface includes the social group name 504 ("Starbucks Centrum") along with the number of members in the social group or chat session ("Chat (7)"). A plurality of messages 902 (text messages or instant messages) of a conversation thread are presented in a message conversation thread field 904, which is updated when new messages are communicated amongst members. The user of the mobile device 102 may enter text into a message input field 906 where a cursor 908 is positioned, and subsequently send the message. A plurality of user input controls 910 may be provided to facilitate the entry and sending of such text or other information (text, file attachments, photos, etc.).

Figure 10:
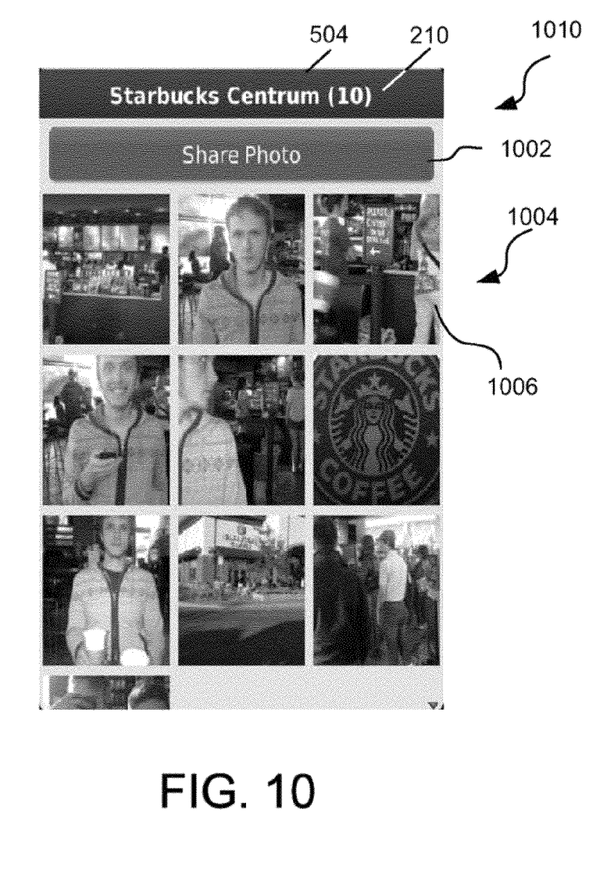
FIG. 10 is an illustrative example of the display module which is providing a photostream session interface for a photostream session involving members of the selected social group that the user has entered into.

In FIG. 10, what is presented in display module 210 is a photostream session interface 1010 for a photostream session being participated in by the members of the social group. The photostream session may be entered in response to an actuation of the associated input prompt (see e.g. FIG. 8 described above). In this example, the photostream session interface includes the social group name 504 ("Starbucks Centrum") along with the number of members in the photostream session ("Chat (7)"). A plurality of photographic images 1004, such as a photographic image 1006, of a photostream session thread are presented and shared amongst the members in a photostream session thread field. Provided is an input prompt 620 for sharing a photographic image, an actuation of which causes a taking of a new photographic image and/or the communication of a photographic image. The user of the mobile device 102 may take photographic images using a camera module provided in the mobile device 102, and these photographic images will be communicated and displayed in the photostream session thread field.

The operations set forth in the methods may be contained as utilities, programs, or subprograms, in any desired computer accessible medium. In addition, the methods may be embodied by computer programs, which may exist in a variety of forms both active and inactive. For example, the computer program may exist as software program(s) comprised of program instructions in source code, object code, executable code or other formats. Any of the above may be embodied on a computer readable medium. Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Thus, techniques have been described for facilitating participation in nearby user-relevant social groups for a mobile device. In one illustrative example, the mobile device is associated with a user profile which includes one or more user interests of a user. The mobile device sends a request for identifying social groups in a mobile geographic location. Each social group is represented by a social group profile which includes a social group name, one or more social group interests, and a social group geographic location. In response to the request, the mobile device receives data identifying a plurality of social group profiles corresponding to a plurality of social groups in the mobile geographic location. The mobile device presents a list of the social groups based on the received data. The list of the social groups is ranked in accordance with similarity scores produced between the user and each social group. Each similarity score is produced based on both a proximity identified between the mobile and social group geographic locations, and similarities identified between the one or more user interests and the one or more social group interests. In response to receiving a user input for entering into one of the social groups, the mobile device may enter into the social group and present a chat session interface for a chat session for the selected social group.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a mobile communication device which is associated with a user profile corresponding to a user, the user profile including one or more user interests of the user, the method comprising:
sending a request for identifying social groups, each social group being represented by a social group profile which includes a social group name, one or more social group interests, and a social group geographic location;
in response to the request:
receiving data which identify a plurality of social group profiles corresponding to a plurality of social groups as a function of a geographic location of the mobile device and the one or more user interests of the user; and
presenting a list of the social groups based on the received data, the list of the social groups being ranked in accordance with similarity scores between the user and each social group, each similarity score being produced based on both a proximity identified between the mobile device and social group geographic locations and a similarity identified between the one or more user interests and the one or more social group interests,
wherein the list of the social groups is presented as a plurality of respective headers, each header including an indicator which indicates a status including: (i) the user is a member of that respective social group and the mobile device of the user is within a predetermined distance from that respective social group geographic location or (ii) the user is not a member of that respective social group, wherein the presented list includes a first header including an indicator indicating status (i) and a second header including an indicator indicating status (ii).

2. The method of claim 1, further comprising:
receiving a user input for entering into one of the social groups;
in response to receiving the user input, sending a request to enter into the social group;
in response to sending the request to enter into the social group, entering into the social group; and
presenting a chat or photostream session interface for a chat or photostream session with members of the social group.

3. The method of claim 1, further comprising:
receiving a user input for entering into one of the social groups;
in response to receiving the user input, sending a request to enter into the social group;
in response to the mobile device leaving the social group geographic location, being exited from the social group.

4. The method of claim 1,
wherein each header includes the social group name of the social group.

5. The method of claim 1,
wherein the different statuses (i) and (ii) are indicated by different respective colors.

6. The method of claim 1, further comprising:
obtaining the mobile geographic location of the mobile device; and
sending the request along with the mobile geographic location of the mobile device.

7. The method of claim 1, which is embodied as computer instructions stored in memory of the mobile device.

8. A mobile communication device which is associated with a user profile of a user thereof, the user profile including one or more user interests of the user, the mobile device comprising:
one or more processors;
memory coupled to the one or more processors;
a radio frequency (RF) transceiver module coupled to the one or more processors;
a global positioning system (GPS) receiver module coupled to the one or more processors, the GPS receiver module configured to assist in providing a geographic location of the mobile communication device;
the one or more processors being configured to:
send via the RF transceiver module a request for identifying social groups, each social group being represented by a social group profile which includes a social group name, one or more social group interests, and a social group geographic location;
in response to the request:
receive via the RF transceiver module data identifying a plurality of social group profiles corresponding to a plurality of social groups as a function of a geographic location of the mobile communication device and the one or more user interests of the user; and
present a list of the social groups based on the received data, the list of the social groups being ranked in accordance with similarity scores between the user and each social group, each similarity score being produced based on both a proximity identified between the mobile communication device and social group geographic locations and similarities identified between the one or more user interests and the one or more social group interests,
wherein the list of the social groups is presented as a plurality of respective headers, each header including an indicator which indicates a status including: (i) the user is a member of that respective social group and the mobile communication device of the user is within a predetermined distance from that respective social group geographic location or (ii) the user is not a member of that respective social group, wherein the presented list includes a first header including an indicator indicating status (i) and a second header including an indicator indicating status (ii).

9. The mobile communication device of claim 8, wherein the one or more processors are further configured to:
receive a user input for entering into one of the social groups;
in response to receiving the user input, send via the RF transceiver module a request to enter into the social group; and
in response to sending the request to enter into the social group, enter into the social group; and
present a chat session interface for a chat session involving members of the social group.

10. The mobile communication device of claim 8, wherein the one or more processors are further configured to:
receive a user input for entering into one of the social groups;
in response to receiving the user input, send via the RF transceiver module a request to enter into the social group;
in response to sending the request to enter into the social group, enter into the social group; and
present a photostream session interface for a photostream session involving members of the social group.

11. The mobile communication device of claim 8, wherein each header includes the social group name of the social group.

12. The mobile communication device of claim 8, wherein the one or more processors are further configured to:
obtain the mobile geographic location of the mobile device; and
send via the RF the request with the mobile geographic location of the mobile device.

13. The mobile communication device of claim 8, further comprising:
obtain the mobile geographic location with use of the global positioning system (GPS) receiver; and
send the request with the mobile geographic location of the mobile device.

14. A method in a social networking server, the method comprising:
storing a plurality of profiles, the plurality of profiles including a plurality of user profiles for users and a plurality of social group profiles for social groups, each user profile including a user name and one or more user interests of the user, each social group profile including a social group name, one or more social group interests, and a social group geographic location of the social group;
receiving, from a mobile communication device associated with one of the users, a request for identifying social groups;
in response to the request:
producing a similarity score between the user and each social group based on both a proximity identified between the mobile communication device and social group geographic locations and similarities identified between the one or more user interests and the one or more social group interests; and
sending data identifying a plurality of social group profiles corresponding to the plurality of social groups as a function of a geographic location of the mobile communication device and the one or more user interests of the user, the plurality of social group profiles being ranked in accordance with the similarity scores produced between the user and each social group, wherein a list of the ranked social groups is presented on the mobile communication device as a plurality of respective headers, each header including an indicator which indicates a status including: (i) the user is a member of that respective social group and the mobile communication device of the user is within a predetermined distance from that respective social group geographic location or (ii) the user is not a member of that respective social group, wherein the presented list includes a first header including an indicator indicating status (i) and a second header including an indicator indicating status (ii).

15. The method of claim 14, further comprising:
receiving from the mobile device a request to enter into the social group;
in response to receiving the request to enter into the social group:
entering the user of the mobile device to the social group; and
causing a chat session to be processed for members of the social group which includes the user of the mobile device.

16. The method of claim 14, further comprising:
receiving from the mobile device a request to enter into the social group;
in response to the request to enter into the social group:
- entering the user of the mobile device to the social group; and
- causing a photostream session to be processed for members of the social group which includes the user of the mobile device.

17. The method of claim 14, wherein the data for identifying the plurality of social group profiles comprises the social group names.

18. The method of claim 14, further comprising:
receiving the request along with the mobile geographic location of the mobile device.

19. The method of claim 14, further comprising:
receiving the request along with the mobile geographic location which comprises a global positioning system (GPS) position of the mobile device.

20. The method of claim 14, which is embodied as computer instructions stored in memory of the social networking server.

\* \* \* \* \*